United States Patent
Hatami-Hanza

(10) Patent No.: US 6,429,932 B1
(45) Date of Patent: Aug. 6, 2002

(54) OPTICAL WAVEGUIDES, OPTICAL CIRCUITS AND METHOD AND APPARATUS FOR PRODUCING OPTICAL WAVEGUIDES AND OPTICAL CIRCUITS

(75) Inventor: Hamid N.M.N. Hatami-Hanza, Ottawa (CA)

(73) Assignee: Nu-Wave Photonics Inc., Ottawa ( * ) Notice: Subject to any disclaimer, the term of this patent is extended or adjusted under 35 U.S.C. 154(b) by 0 days.

(21) Appl. No.: 09/471,205

(22) Filed: Dec. 23, 1999

(30) Foreign Application Priority Data

Jan. 20, 1999 (CA) .............................................. 2259350

(51) Int. Cl.[7] .............................................. G01N 21/88
(52) U.S. Cl. ........................................ 356/239.2; 385/51
(58) Field of Search ........................... 356/237.1, 239.1, 356/239.2; 385/51

(56) References Cited

U.S. PATENT DOCUMENTS

| 4,369,202 | A |   | 1/1983  | Verber et al.           |
|-----------|---|---|---------|-------------------------|
| 5,208,136 | A |   | 5/1993  | Zanoni et al.           |
| 5,367,588 | A |   | 11/1994 | Hill et al.             |
| 5,647,040 | A | * | 7/1997  | Modavis et al. ... 385/42 |
| 5,652,819 | A | * | 7/1997  | Orazi ............. 385/51 |
| 5,768,452 | A | * | 6/1998  | Atkins et al. ...... 385/27 |
| 5,837,169 | A |   | 11/1998 | Rourke                  |

FOREIGN PATENT DOCUMENTS

| EP | 0398575 | 11/1990 |
| EP | 0762158 | 3/1997  |
| EP | 0890851 | 1/1999  |
| GB | 2295904 | 12/1996 |

OTHER PUBLICATIONS

Kobayashi et al, Applied Physics Letter, US American Ints. of Physics, vol. 73 No. 23, Dec. 7, 1998, pp. 3336–3338.
Maxwell G D et al, Electronics Letter, GB, IEE Stevenage, vol. 31, No. 2, Jan. 19, 1995, pp. 95–96.
Seok Ho Song et al, IEEE Photonics Technology Letters, US, IEEE, Inc., vol. 9, No. 1, Jan. 1, 1997, pp. 58–60.
Coudray P et al, Optics Communications, NL, North–Holland Publishing Co., vol. 128, No. 1/02/03, Jul. 1, 1996, pp. 19–22.

(List continued on next page.)

*Primary Examiner*—Richard A. Rosenberger
(74) *Attorney, Agent, or Firm*—Friedrich Kueffner

(57) ABSTRACT

Optical circuits, in optical waveguide structures, are provided by making grating elements in patterns defined by perturbations of the refractive index of the waveguide material. An optical waveguide including ultraviolet (UV) photosensitive material is carried by a substrate to provide a waveguide assembly. The assembly is overlaid with a first mask being nontransparent to ultraviolet light and having a transparent aperture which defines an area of the optical waveguide for formation of an optical circuit. The first mask also includes registration targets. A grating mask with ports for passing ultraviolet light is removably clamped in a space registered relationship over the first mask, to provide a process assembly which is vibration tolerant. Exposing the grating mask to an ultraviolet radiation source, such as a UV lamp, forms the desired perturbations to affect the grating elements. The grating mask is removed and is reusable. As the location of each grating element is defined in relation to the registration targets, either the manufacturer or a user is at liberty to post-manufacture adjust the optical circuit using a narrow beam of ultraviolet light controlled to impinge upon one or more grating elements.

3 Claims, 5 Drawing Sheets

OTHER PUBLICATIONS

"Optical Control of Microwaves . . . " Electronics Letters, GB, IEE Stevenage, vol. 25, No. 3, Feb. 2, 1989, pp. 177–179.

Meltz G et al, Optics Letters, US, Optical Society of America, Washington, vol. 14, No. 15, Aug. 1, 1989, pp. 823–825.

Hill K O et al, Applied Physics Letters, US American Institute of Physics, vol. 62, No. 10, Mar. 8, 1993, pp. 1035–1037.

Huebner J et al, Proceedings of the SPIE, 1996, XP000878640, Cited in the Application.

Najafi S I et al, Proceedings of the SPIE, 1996, XP000878641, Cited in the Application.

Yang L et al, Analytical Chemistry, US, American Chemical Society, Columbus vol. 66, No. 8, Apr. 15, 1994, pp. 1254–1263.

* cited by examiner

OPTICAL WAVEGUIDES, OPTICAL CIRCUITS AND METHOD AND APPARATUS FOR PRODUCING OPTICAL WAVEGUIDES AND OPTICAL CIRCUITS

FIELD OF THE INVENTION

The invention is in the field of optics, manufacturing methods and processes for producing optical devices and optical devices so produced and being useful for performing operations on optical signals, including but not being limited to filtering, diffracting, discriminating and sensing.

BACKGROUND OF THE INVENTION

Optical Bragg grating devices are used for performing many operations on optical signals, such as filtering, light diffraction, and sensing. Optical waveguide grating, in particular, do theses function while guiding and confining the light in the waveguide medium as well. A waveguide grating is normally formed on a waveguide in which at least one of its parameters is changed almost periodically along the length of the waveguide. The most commonly perturbed physical parameter in waveguide grating structures is the refractive index. The waveguide structure with periodically perturbed refractive index can be used as an optical filter in which an optical signal is reflected back by the grating structure at the Bragg wavelength defined by:

$$\lambda_B = 2n_{eff}\Lambda$$

where $\lambda_B$ is the Bragg resonance wavelength and $n_{eff}$ is the average effective index of the waveguide, and $\Lambda$ is the longitudinal period of refractive index change along the waveguide. A variety of optical wavelength band reflection/rejection or transmission filters can be designed consequently to perform the desired functions. The optical filter can be designed to have very narrow, that is less than 0.1 nm line width, or to have relatively wide band filters with desired transmission reflection wavelength characteristics in the order of few tens of nm line-width. For instance they can be used for separating one particular band of the optical signal in wavelength division multiplexing (WDM) optical transmission system or as dispersion compensators in long haul transmission systems.

An efficient and popular method of imprinting gratings on waveguides is to use photosensitive waveguides whose refractive index can be changed by exposure to radiation of a particular nature, for example ultraviolet (UV) electromagnetic radiation. Usually a grating is imprinted by exposing the waveguide under an interferometric pattern of ultraviolet sources using holographic or phase mask methods. Imprinting grating by holographic method is described in an article entitled, "Formation of Bragg Gratings In Optical Fiber By Transverse Holographic Method", by G. Melts et al., published in 1989 in Optics letter Vol. 14, No. 15, at pages 823–825. In the holographic, or interferometric method, waveguide grating is formed by exposing the piece of fiber to an interfering pattern of two ultraviolet beams of light to produce a standing wave to which the waveguide is exposed. The refractive index of the waveguide is locally and periodically changed in the exposed area. This grating fabrication approach requires a laser with high spatial and temporal coherence, and is highly sensitive to alignment and vibration during production. These requirements are more strict in the case of a chirped grating in which the period of grating pitches must be changed along the waveguide. Imprinting grating using a phase mask method is described, for example, in an article entitled, "Bragg Gratings Fabricated In Monomode Photosensitive Optical Fiber By UV Exposure Through A Phase Mask" by K. O. Hill et al. published in 1993 in Applied Physics Letters, Volume 62, No. 10, pages 1035–1037. The method is also published in the U.S. Pat. No. 5,367,588, issued to K. Hill et al on Nov. 22, 1994 and entitled, "Method of Fabricating Bragg Grating Using A Silica Phase Grating Mask and Mask Used By Same". In this approach, a phase mask splits the beam into several diffractive orders that interfere to create the required pattern. The phase mask method is less sensitive to spatial coherence and alignment. It can also be used to produce chirped gratings. However it still needs proper optical alignment, careful control of the space between the phase mask and the waveguide, with a precise control of waveguide motion under the phase mask at the same time. In the U.S. Pat. No. 5,837,169, "Creation Of Bragg Reflective Gratings In Waveguides," by H. N. Rourke, Issued No. 1998, there is disclosed a method of writing long fiber grating at several stages using a number of phase masks that have an alignment part which is a replicate of the portion of the writing part of the adjacent mask. Careful motion adjustment must be made to align the consequent masks and keep the writing conditions the same for each stage of writing gratings. A number of research papers and patent disclosures, some of which are listed herein, propose new optical devices using Bragg grating or disclose improved methods of imprinting Bragg grating based on the two above mentioned methods. Nevertheless, grating fabrication method using these approaches are still time consuming and unpredictable due to the required mechanical motion accuracy and stability. This results in low yield in fabrication and therefore a high manufacturing cost. Therefore there is a need for alternative methods of manufacturing Bragg grating devices on waveguides that is suitable for volume manufacturing.

SUMMARY OF THE INVENTION

In accordance with an aspect of the invention, a method for manufacturing an optical circuit includes provision of an optical waveguide being carried by a surface of a substrate, the optical waveguide having a light transmission property which is alterable in response to radiation of a predetermined nature. A first mask is applied to the surface of the substrate, the first mask being non-transparent to the radiation and includes registration means and a radiation transparent aperture defined therein for permitting a predetermined area of the optical waveguide to be exposed to the radiation. A second mask is affixed over the first mask in alignment with the registration means. The second mask includes a plurality of ports defined therein, each of the ports overlapping the aperture and being transparent to the radiation. A predetermined amount of the radiation is directed at the second mask, whereby areas of the optical waveguide are exposed via said ports and the aperture such that a light transmission property in each of said areas is altered to effect manufacture of the optical circuit.

Advantageously the second mask is removed from the optical circuit and is useful in the fabrication of similar optical circuits.

In accordance with an another aspect of the invention, a process for effecting post manufacture adjustment of an optical circuit having been formed in an optical waveguide having a light transmission property being alterable by exposure to radiation of a predetermined nature, includes the steps of: a) determining an operating characteristic of the optical circuit by transmitting light energy in a spectrum in which the optical circuit is intended to be operable via said optical circuit and receiving and detecting any of said light energy having traversed the optical circuit; b) determining if the operating characteristic is adjustable toward an operating parameter standard by adjusting the light transmission property of at least one predefined portion of the optical circuit, and if YES; c) selectively exposing the at least one predefined portion of the optical circuit to a beam of radiation while continuing to perform step a) and if the determination in step b) becomes NO, stopping the exposure in step c).

An apparatus in accordance with an another aspect of the invention, provides for post manufacture processing of an optical circuit including an optical waveguide having a light transmission property which has been altered by exposure to radiation. The apparatus includes a table for mounting the optical circuit and a beam source for providing a beam of radiation of a predetermined nature for impinging upon an optical circuit mounted on the table. A source of light energy in a spectrum in which the optical circuit is intended to be operable is connectable for transmitting light to the optical circuit when it is mounted on the table. A detector is connectable to receive light energy from the optical circuit when mounted on the table. The detector generates indications representative of received light energy. A controller is dependent upon the indications of received light energy from the detector and a data base peculiar to a particular design of an optical circuit, for selection at least one portion of an optical circuit mounted on the table and directing the beam of electromagnetic radiation from the beam source means upon a selected portion of the mounted optical circuit.

In accordance with yet another aspect of the invention an optical waveguide assembly comprises a circuit substrate having a substantially planar surface and an optical waveguide being imbedded in the substantially planar surface of the circuit substrate. The optical waveguide has a light transmission property being alterable in response to radiation of a predetermined nature. A mask overlies the substantially planar surface of the substrate and the optical waveguide. The mask includes an aperture therein for defining an area of the waveguide which is accessible for exposure to said electromagnetic radiation. The mask also includes a registration means to provide for alignment of the substrate with processing apparatus useful in the manufacture of an optical circuit.

In one example the optical waveguide assembly includes an optical circuit being contained along and within a portion of the optical waveguide in a substrate overlaid with a first mask and having been manufactured by exposure of areas of the optical waveguide, via a grating mask registered with the first mask, to electromagnetic radiation of an incoherent nature within the ultraviolet spectrum. After manufacture the grating mask is removed and an aperture in the first mask defines an area of said portion of the waveguide which is available for post manufacture modification by controlled exposure to said electromagnetic radiation.

BRIEF DESCRIPTION OF THE DRAWINGS

Example embodiments of the invention are described with reference to the accompanying drawings in which.

DETAILED DESCRIPTION

Figure 1:
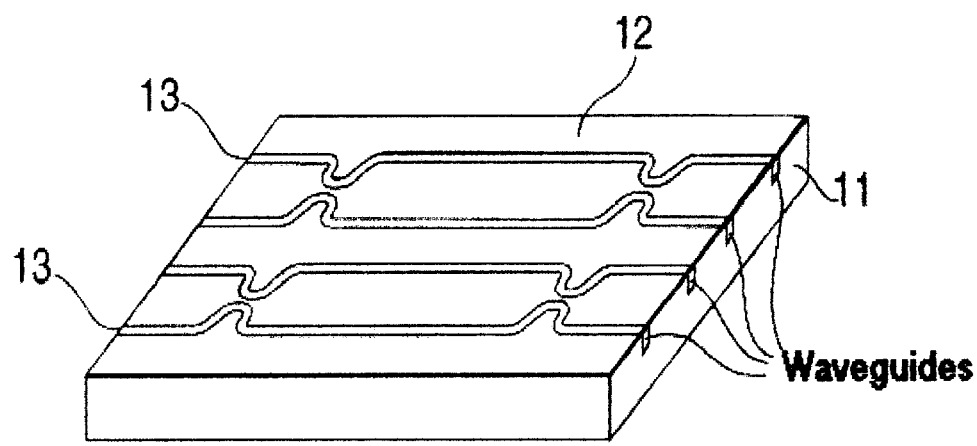
FIGS. 1, 2 and 3 are exemplary of some arrangements of optical waveguide assemblies which are suitable for use in a manufacturing process in accordance with the invention.

The optical waveguide assembly in FIG. 1 is shown as having a substrate 11 with a planar surface 12 having several optical waveguide elements 13 lodged therein. Such an optical waveguide assembly is fabricated by any of several conventional methods such as flame hydrolysis, sol-gel deposition and the like.

Figure 2:
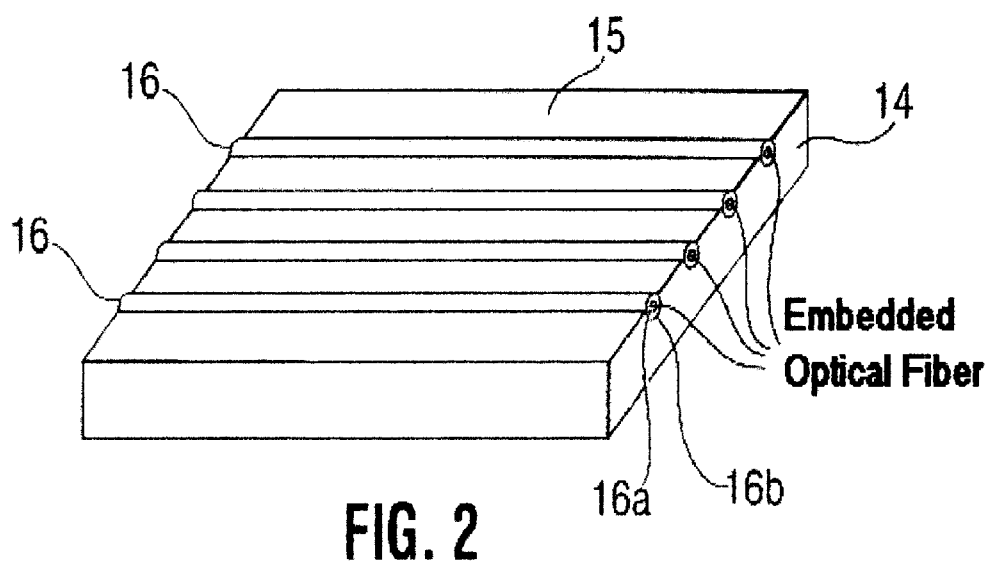

The optical waveguide assembly in FIG. 2 is shown as having a substrate 14 with a planar surface 15 having several optical waveguide elements 16 lodged therein. In one example such an optical waveguide assembly is fabricated by embedding optical fibers into grooves having been formed in the planar surface 15. Each of the optical fibers includes a core 16a shrouded by a layer of cladding 16b.

Figure 3:
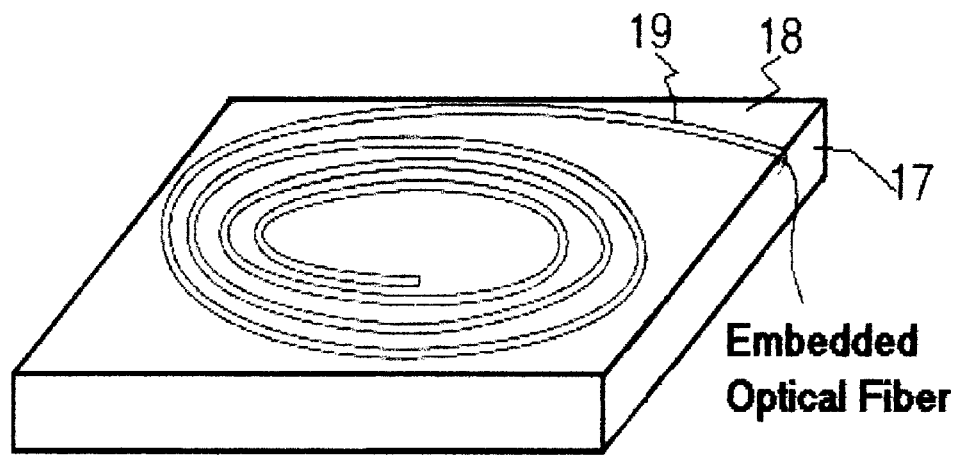

The optical waveguide assembly in FIG. 3 is shown as having a substrate 17 with a planar surface 18 carrying an embedded optical fiber 19 in the form of a spiral.

In these waveguide assemblies one or more of the waveguides or optical fibers contains a photosensitive material in at least one of the core and the cladding. Photosensitive materials are often photo-refractive to a particular spectrum of an electromagnetic radiation. Photosensitive materials which exhibit a noticeable change of refractive index upon an exposure to ultraviolet light have been found to be convenient, however other materials showing photosensitivity to electromagnetic radiation in other spectrums are envisaged as being useful. One or more of the waveguides 13 contain at least one photosensitive area and are fabricated for instance by depositing a layer of photosensitive sol-gel glass as the cladding on the waveguide circuits, made of a variety of materials, as disclosed in a Canadian patent application number 2190-886 by H. Hatami-Hanza et al. filed Nov. 21, 1996. The waveguide 13 can also be made entirely by sol-gel glass method as described for example in an article, "Fabrication and Characterization of Low-Loss, Sol-Gel Planar Waveguides, published in 1994 volume 66 of Anal. Chem, pp. 1254–1263 and in another article, "Ultraviolet light imprinted sol-gel silica glass channel waveguides on silicon, Authored by Najafi et al., published in 1996 in vol. 2695 of the SPIE, pp. 38–41. The waveguide 13 with at least one photosensitive area can also be fabricated by a flame hydrolysis method using germanium doped silica glass deposition as described in an article by Jorg Huber et al., entitled, "UV-Written Y-Splitter in Ge Doped Silica," published in 1996 in vol. 2695 of the SPIE, pp. 98–105.

In another embodiment of samples, as shown in FIGS. 2 and 3, the optical fibers have been embedded in a substrate such as glass or a silicon. A method of embedding optical fibers in a substrate has been described in a patent application by H. Hatami-Hanza and V. Benham, filed in Canada, and entitled, "An Integrated Optical Board Comprising Integrated Optic Waveguide Circuit Modules". Accordingly optical fibers are first embedded in the substrate in grooves with the desired shape. The embedded fibers are then affixed and perhaps covered by an adhesive and annealed to solidify the substrate with the fibers embedded therein to provided an assemble similar to that shown in FIG. 2. The substrate with embedded optical fibers is then polished to achieve almost optically flat surface wherein the cladding or core of each of the optical fibers is exposed and becomes a constituent of an optically flattened surface. In FIG. 2 optical fibers 16 are shown embedded in parallel grooves on the substrate and in FIG. 3 a long piece of optical fiber 19 has been embedded in the form of a spiral in a the substrate 18. The assembly in FIG. 3 is particularly useful for writing a long grating on the optical fiber to perform various functions, one such function being dispersion compensation, for example. Waveguide assemblies as in any of FIGS. 1, 2 and 3 may be written or otherwise provided with gratings or other elements to produce a desired optical circuit. The range of sizes of such waveguide assemblies is practically unlimited. Waveguide assemblies on substrates of dimensions ranging from a few millimeter to 20 centimeters or so, in rectangular and other forms, are contemplated.

Figure 4:
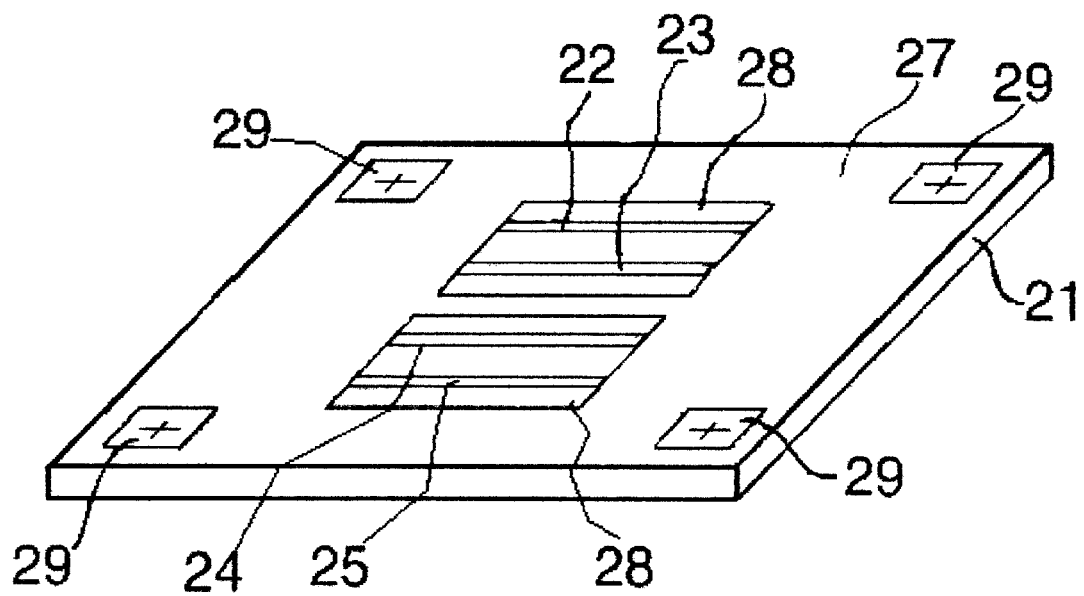
FIG. 4 illustrates a first stage of manufacture of an optical circuit using an optical waveguide assembly, for example like that shown in FIG. 2.

Referring to FIG. 4, a waveguide assembly is provided by a substrate 21 and embedded optical fibers having areas 22, 23, 24 and 25, each of which includes photosensitive material as yet unexposed to ultraviolet light. The waveguide assembly is shown to be masked by a first mask which defines a pattern with areas under apertures 28 where optical circuits are to be formed and also defines alignment marks or targets 29 as registering means. The first mask is produced by depositing a layer 27 of a material which is not transparent to ultraviolet light upon the substrate 21. The deposited layer can be a metal, such as chromium or aluminum, or any other suitable material which is not transparent to ultraviolet light, for example polymer resists. Next a pattern is transformed from a pattern mask (not shown) onto the deposited layer, for example by conventional photolithography or by electron-beam lithography. The fundamentals of the lithography and the associated process are described for example in a monograph entitled "Eximer Laser Photography," by Kanti Jain, published in SPIE, 1989 and in a book entitled "Introduction to Microelectronics Fabrication, Molecular Series on Solid State Devices", volume 5, authored by Richard Jaeger, edited by Gerold W. Neubeck, and Robert F. Pierret, and published in 1993 by the Addison-Wesley Publishing Company. The pattern being so transformed provides the desired apertures 28 and alignment marks 29 within the first mask.

Figure 5:
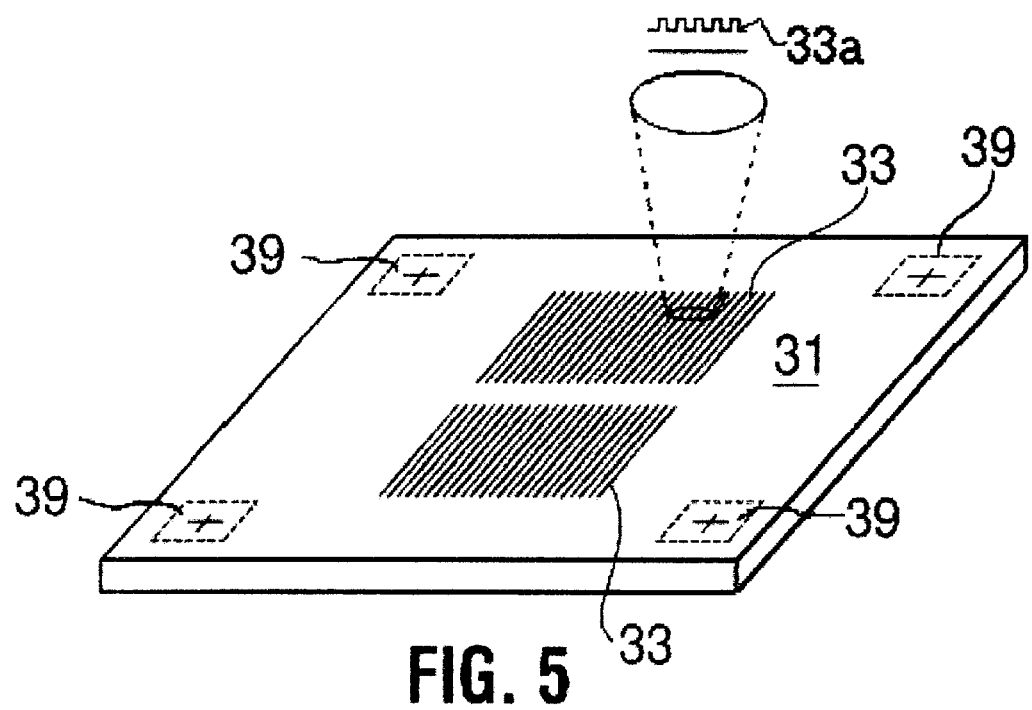
FIG. 5 illustrates a grating mask useful for processing an optical waveguide assembly similar to that shown in FIG. 4.

Referring to FIG. 5, the grating mask includes a silica substrate 31 with phase gratings 33 (part of which is shown enlarged as detail 33a) and targets or alignment marks 39 so located within the substrate 31 as to correspond with the apertures 28 and alignment marks 29 within the first mask.

The grating mask is fabricated for example by direct electron-beam writing over a silica substrate, masked with a layer of resist or metal, followed by an associated etching method to create an etched phase grating over the silica for the desired wavelengths. The fundamentals of electron beam lithography and processes are described in chapter 5 of "Electron-based Technology in Microelectronics Fabrication", edited by Goarge Barnere and published in 1980 by the Academic Press.

The grating mask can have as many phase gratings as can be fabricated over the areas corresponding to the apertures 28 mask and may include phase gratings with chirped pitches.

Figure 6:
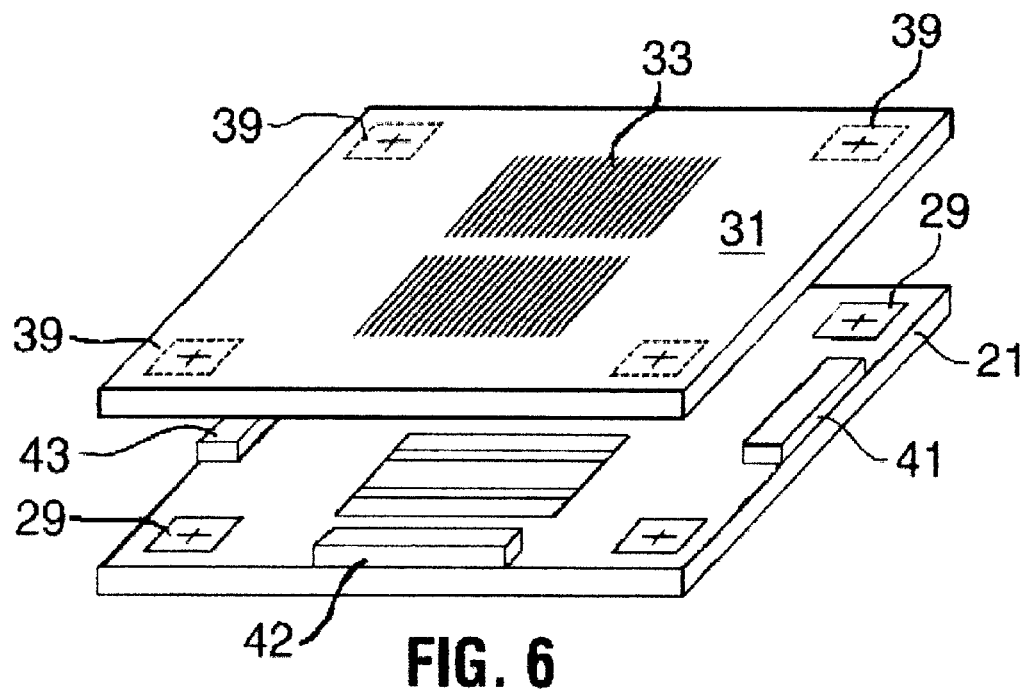
FIG. 6 illustrates the optical waveguide assembly of FIG. 4 and the grating mask of FIG. 5 in vertical alignment preparatory to a process assembly.

FIG. 6 illustrates the optical waveguide assembly of FIG. 4 and the grating mask of FIG. 5 in vertical alignment preparatory to the process for writing of grating on the designated areas to form the desired optical circuits. Gaskets 41, 42, 43, and 44 rest on the first mask adjacent the four edges of the planar substrate 21, the gasket 44 being obscured by the silica substrate 31. The gaskets 41, 42, 43, and 44 may by made of strips of a compressible material such as Teflon and support the grating mask spaced closely adjacent the substrate 21.

Figure 7:
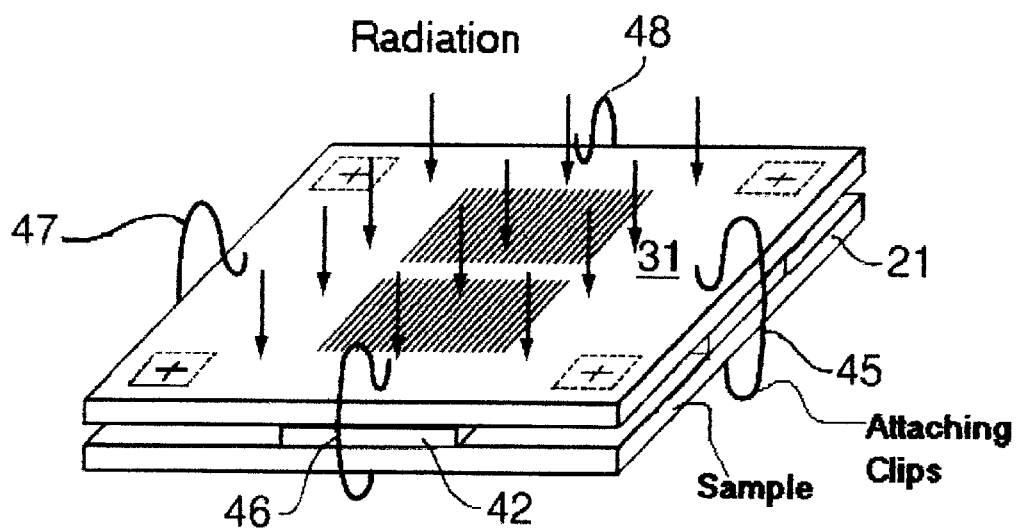
FIG. 7 illustrates elements of FIGS. 5 and 6 in a process assembly suitable for radiation with non-coherent ultraviolet light to provide the optical circuit.

Referring to FIG. 7, elements of FIGS. 4 and 5 are shown in a process assembly suitable for irradiation with non-coherent ultraviolet light to provide the optical circuit. The grating mask is brought into close proximity with the waveguide assembly and placed over the gaskets in such a way that targets 29 and 39 are in precise alignment ensuring the satisfactory matching of the phase grating on the corresponding apertures over the waveguide assembly. The silica substrate 31 is removably attached to the substrate 21 by resilient wire clips 45–48 to maintain the aligned relationship. Alternately the substrates may be attached perhaps with some temporary adhesive or the like. Thickness of the gaskets 41–44 should be substantially uniform and may be selected to be between 10 to 100 micron depending on the flatness of the layer 27. The placement of gaskets ensures that the substrate 31 is affixed spaced from the surface of the layer 27 at a predetermined distance and that the substrate 21 and the silica substrate 31 do not move relative to each other once attached in compression by the wire clips 45–48. The resulting structure is relatively impervious to vibration such that the vibration free condition over the time for writing grating on the photosensitive waveguide is greatly relaxed. Exposure can be done in a clean environment with a broad band ultraviolet light source such as ultraviolet lamps. The source of the electromagnetic radiation is advantageously an ultraviolet lamp with large aperture area, so that the radiation covers at least the whole area of the phase gratings 33 and waveguides therebeneath. After exposer to the ultraviolet light the grating mask is detached from the resulting optical circuits, and it is available for reuse in the manufacture of more optical circuits of substantially similar operating parameters. The optical circuits remain in the substrate 21 but the layer 27 may be removed or alternately the layer 27 may be imprinted with one or more additional patterns by the lithography process before packaging.

Figure 8:
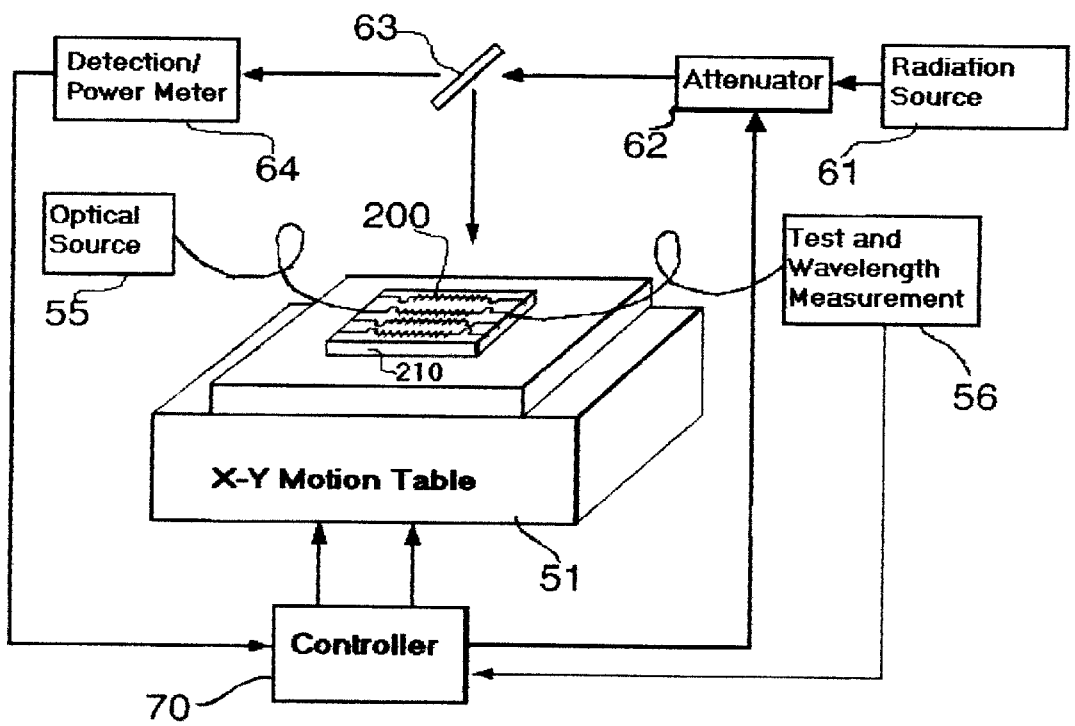
FIG. 8 illustrates an apparatus for post manufacture processing of an optical circuit having been manufactured by controlled exposure to ultraviolet light as exemplified in FIG. 7.
Figure 9:
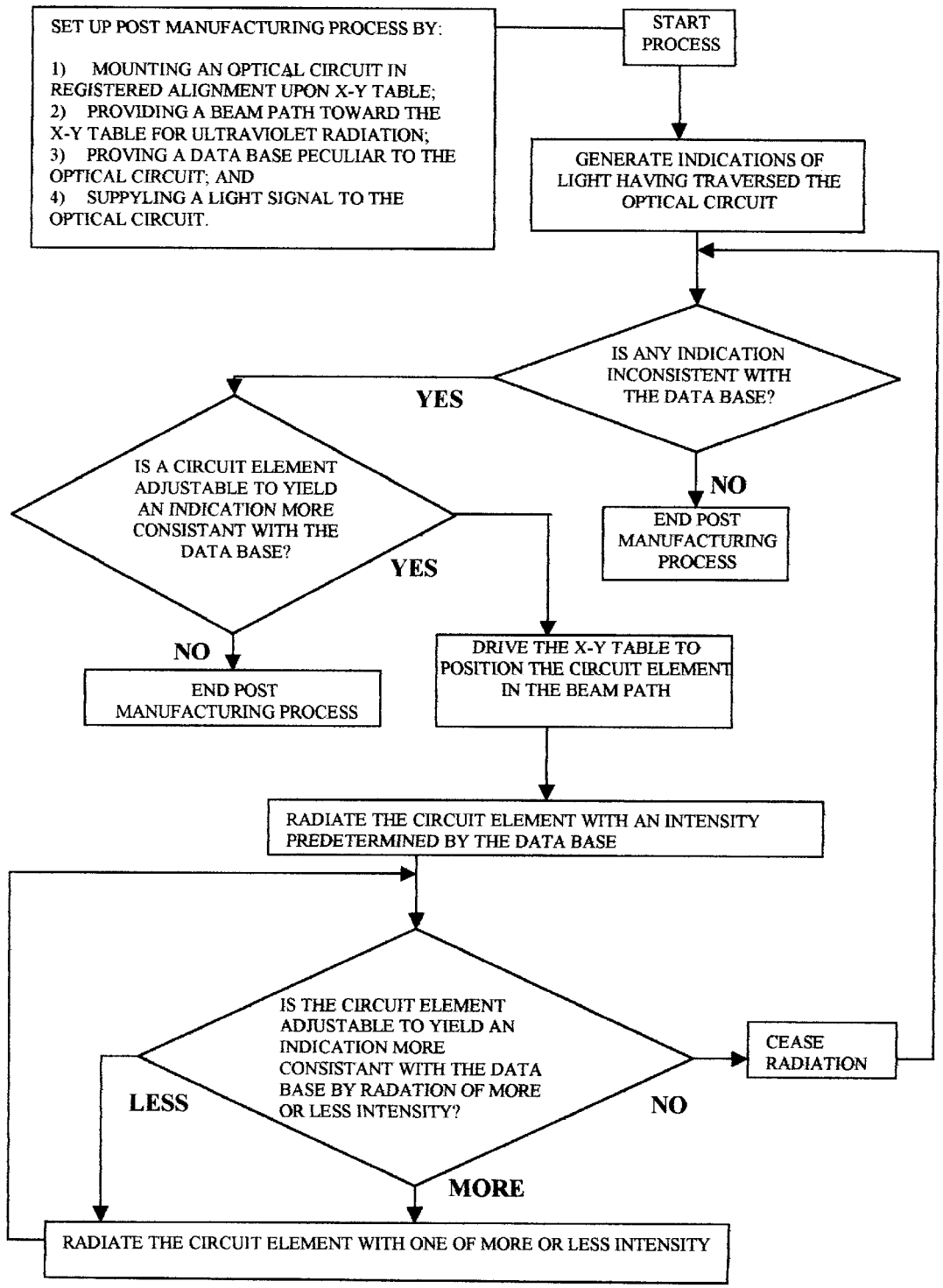
FIG. 9 is a flow chart illustration being exemplary of functions by which the post manufacture processing apparatus shown in FIG. 8 is operable.

Referring to FIGS. 8 and 9, the processing apparatus illustrated is useful for tuning the operating parameters of an optical circuit manufacture as previously disclosed. An optical circuit so manufactured has the benefit of having the spacial locations of its physical circuit elements being precisely defined relative to the targets 29. Thus these circuit elements are easily located for individual and virtually isolated exposure to a modulated ultraviolet beam in a post manufacturing process. The apparatus show in FIG. 8 includes an X-Y motion table 51 for mounting an optical circuit 200 carried in a substrate 210. A beam source of ultraviolet radiation 61 provides a beam via a variable attenuator 62 for modulating the intensity of the radiation. Thereafter the beam is divided by a beam splitter 63 so that a portion of the beam is directed toward the X-Y table 51 and the remainder of the beam is detected by a detection power meter 64. An optical source 55 provides light energy in a spectrum in which the optical circuit 200 is intended to be operable and is shown connected thereto. A test and wavelength measurement device 56 provides a detection means for receiving light energy from the optical circuit and generates indications representative of received light energy.

A controller 70 operates dependent upon the indictions representative of received light energy from the test and wavelength measurement device 56, beam power detected by the detection power meter 64, and a predetermined data base peculiar to a particular design of the optical circuit. In accordance with the flow chart in FIG. 9, the controller 70 determines if further radiation of any particular one of the circuit elements in the optical circuit 200 would favourably affect the operating characteristics of the optical circuit 200. If YES, the controller generates X and Y drive signals to manipulate the X-Y motion table 51 to place the circuit element in the path of the beam. Then the controller 70 reduces the attenuation of the attenuator 62 to let a predetermined amount of ultraviolet light energy impinge upon the circuit element. As the operating characteristics are sensed via the test and wavelength measurement device 56 the controller adjusts the intensity of radiation in the beam path and eventually terminates the exposure. Subsequently the controller 70 determines if another circuit element is adjustable and if such adjustment would favourably affect the operating characteristics of the optical circuit 200. Dependent upon the data base the controller 70 may move the X-Y motion table 51 to select another circuit element for similar treatment and so on until no further circuit elements are identified as being adjustable for the intended effect. By this function an individual optical circuit is finely tuned or adjusted for an intended application. This final step of adjustment can be performed before or after the packaging and it is envisaged that it may even be performed by the consumer or user of the optical circuit.

Persons of typical skill in this art and with knowledge of the foregoing disclosure will become aware of modifications, and variations which are within the spirit of the invention as defined in the appended claims.

What is claimed is:

1. An apparatus for post manufacture processing of an optical circuit including an optical waveguide having a light transmission property which has been altered by exposure to radiation, the apparatus comprising:

a table for mounting the optical circuit;

a beam source means for providing a beam of radiation of a predetermined nature for impinging upon the mounted optical circuit;

a source of light energy in a spectrum in which the mounted optical circuit is intended to be operable, the source of light energy being connectable for transmitting light to the mounted optical circuit;

detecting means being connectable to receive light energy from the mounted optical circuit and to generate indications representative of received light energy;

a controller being dependent upon the indictions representative of received light energy and a data base peculiar to a particular design of the mounted optical circuit for selecting at least one portion of the mounted optical circuit and directing the beam of electromagnetic radiation from the beam source means upon a selected portion of the mounted optical circuit; and wherein the table is movable responsive to the controller, and the beam source means includes an attenuator being responsive to an intensity signal from the controller whereby when the optical circuit is mounted on the table a portion of the optical circuit is selectable for exposer to variable intensities of said beam of radiation.

2. An apparatus as defined in claim 1 wherein the beam source means is limited to providing a beam of electromagnetic radiation within the ultraviolet spectrum.

3. An apparatus as defined in claim 2 wherein the table is responsive to X and Y drive signals from the controller.

* * * * *